(12) United States Patent
Moncada

(10) Patent No.: US 9,970,570 B2
(45) Date of Patent: May 15, 2018

(54) SHUT-OFF VALVE REPAIR SYSTEM

(71) Applicant: Jack Moncada, South Ozone Park, NY (US)

(72) Inventor: Jack Moncada, South Ozone Park, NY (US)

(*) Notice: Subject to any disclaimer, the term of this patent is extended or adjusted under 35 U.S.C. 154(b) by 0 days. days.

(21) Appl. No.: 15/276,879

(22) Filed: Sep. 27, 2016

(65) Prior Publication Data
US 2018/0087690 A1 Mar. 29, 2018

(51) Int. Cl.
*F16K 43/00* (2006.01)

(52) U.S. Cl.
CPC .......... *F16K 43/001* (2013.01); *F16K 43/003* (2013.01); *Y10T 137/87917* (2015.04)

(58) Field of Classification Search
CPC ...... F16K 43/001; F16K 43/003; F16K 43/00; Y10T 137/87917
USPC .............................................. 137/613; 4/623
See application file for complete search history.

(56) References Cited

U.S. PATENT DOCUMENTS

| | | | |
|---|---|---|---|
| 2,967,042 A | 1/1961 | Richter | |
| 3,472,532 A | 10/1969 | Leopold | |
| D345,006 S | 3/1994 | Gallagher | |
| 5,577,530 A | 11/1996 | Condon | |
| 5,810,331 A * | 9/1998 | Smock | F16L 19/103 251/148 |
| 6,006,784 A * | 12/1999 | Tsutsui et al. | E03C 1/0403 137/359 |
| 6,363,549 B2 * | 4/2002 | Humpert et al. | E03C 1/05 251/129.03 |
| 7,014,166 B1 * | 3/2006 | Wang | E03C 1/05 251/129.03 |
| 8,066,025 B2 | 11/2011 | Anderson | |
| 8,616,229 B2 | 12/2013 | Jacoway | |
| D723,660 S | 3/2015 | Hatta et al. | |

* cited by examiner

*Primary Examiner* — Kevin Lee

(57) ABSTRACT

A shut-off valve repair system includes a shut-off valve. The shut-off valve is fluidly coupled between a fluid supply and a plumbing fixture. Thus, the shut-off valve selectively restricts and allows a flow of a fluid to the plumbing fixture. A valve unit is selectively fluidly coupled to the shut-off valve when the shut-off valve fails. Thus, the valve unit selectively inhibits and allows the fluid to flow to the plumbing fixture.

4 Claims, 3 Drawing Sheets

SHUT-OFF VALVE REPAIR SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to repair devices and more particularly pertains to a new repair device for repairing a failed shut-off valve.

BRIEF SUMMARY OF THE INVENTION

An embodiment of the disclosure meets the needs presented above by generally comprising a shut-off valve. The shut-off valve is fluidly coupled between a fluid supply and a plumbing fixture. Thus, the shut-off valve selectively restricts and allows a flow of a fluid to the plumbing fixture. A valve unit is selectively fluidly coupled to the shut-off valve when the shut-off valve fails. Thus, the valve unit selectively inhibits and allows the fluid to flow to the plumbing fixture.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
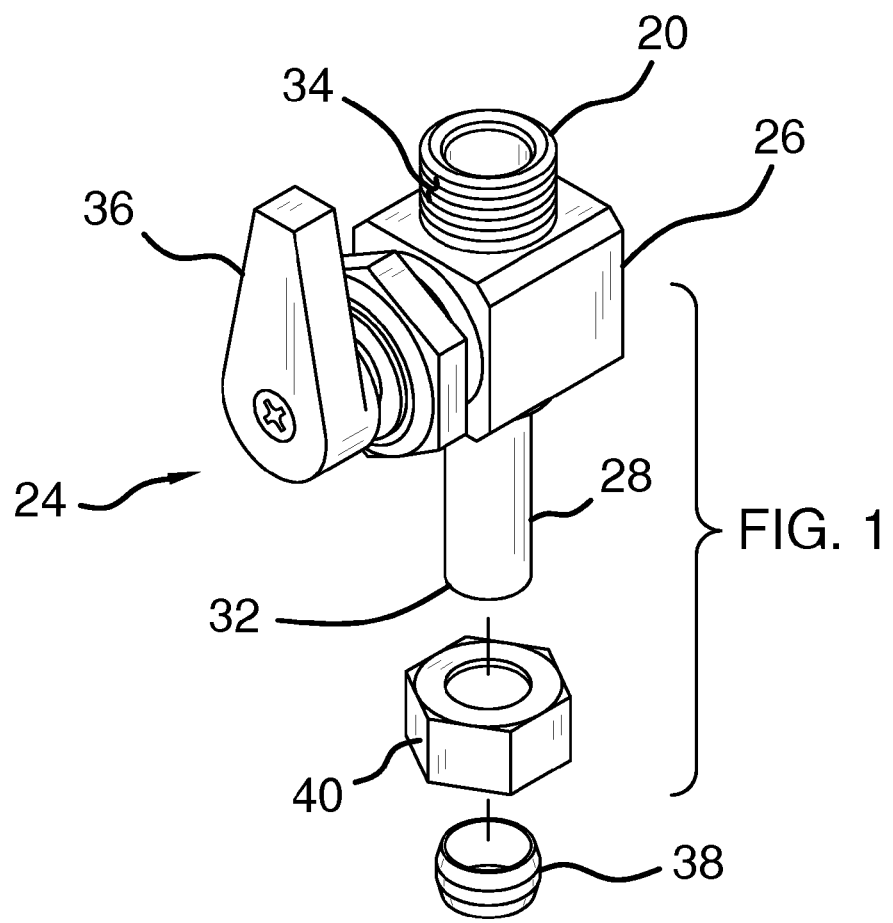
FIG. 1 is an exploded perspective view of a valve unit of a shut-off valve repair system according to an embodiment of the disclosure.
Figure 2:
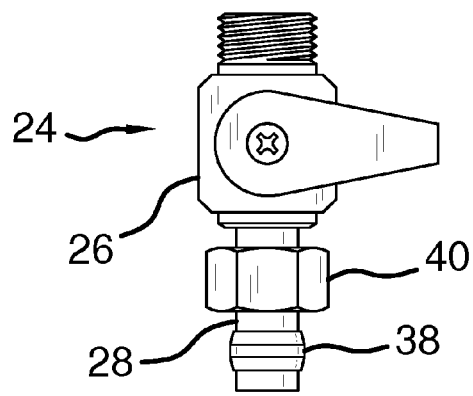
FIG. 2 is a front view of a valve unit of an embodiment of the disclosure.
Figure 3:
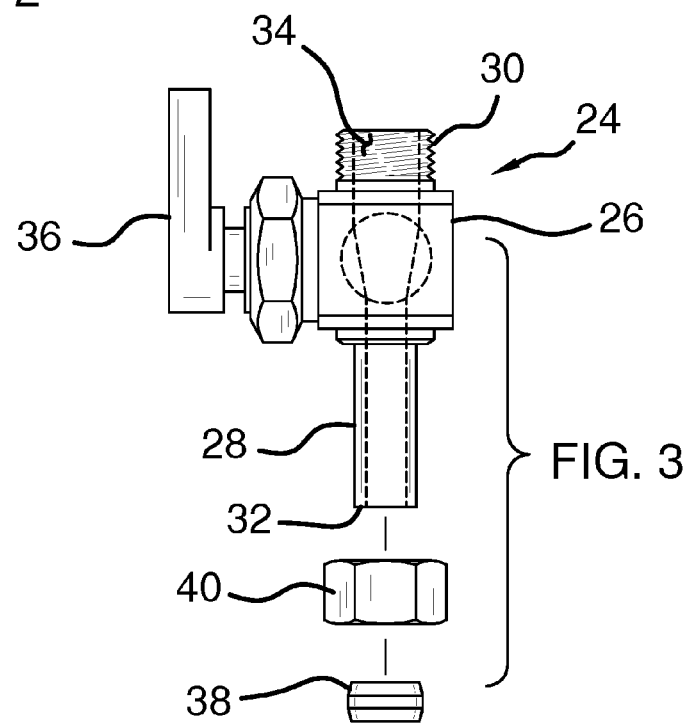
FIG. 3 is a right side phantom view of valve unit of an embodiment of the disclosure.
Figure 4:
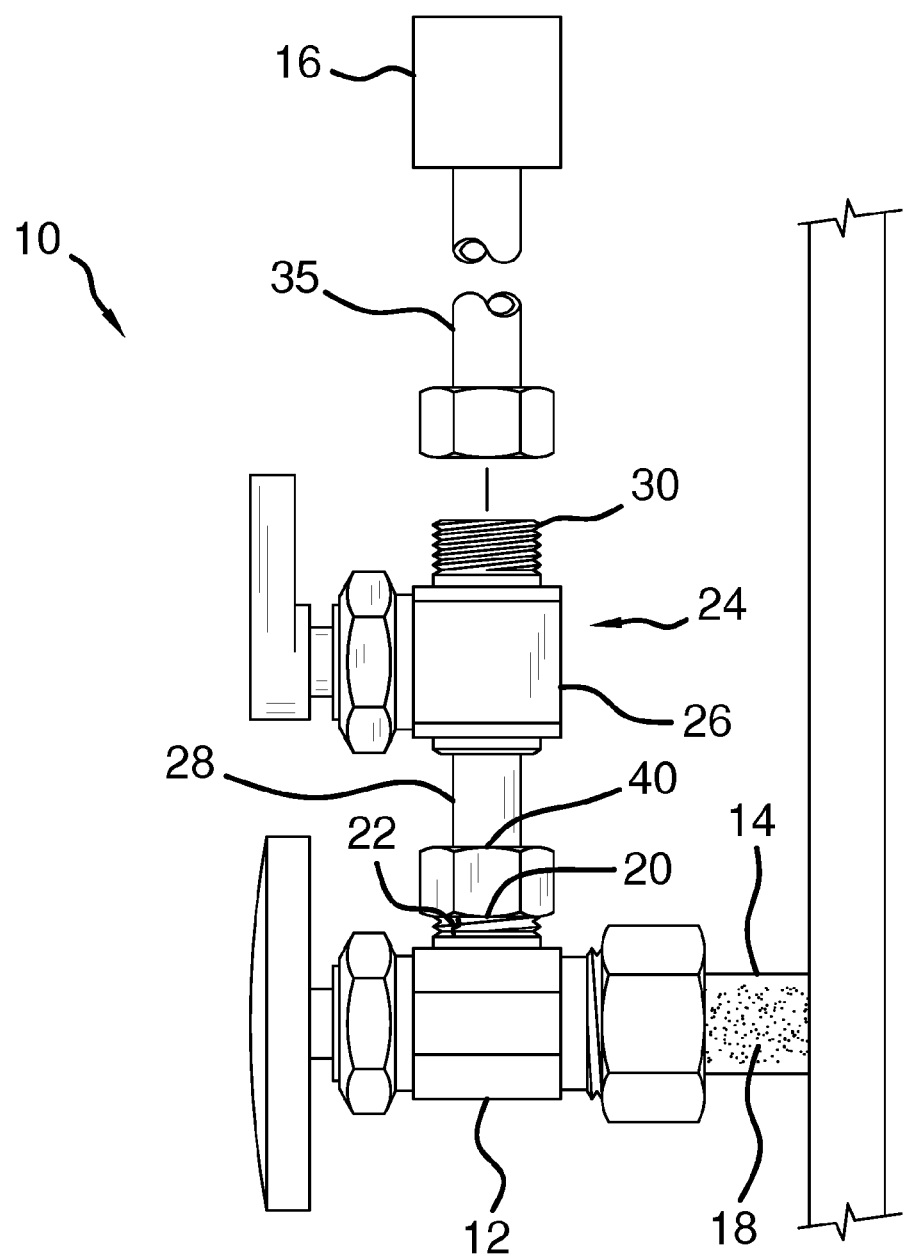
FIG. 4 is a perspective in-use view of an embodiment of the disclosure.

With reference now to the drawings, and in particular to FIGS. 1 through 4 thereof, a new repair device embodying the principles and concepts of an embodiment of the disclosure and generally designated by the reference numeral 10 will be described.

As best illustrated in FIGS. 1 through 4, the shut-off valve repair system 10 generally comprises a shut-off valve 12. The shut-off valve 12 is fluidly coupled between a fluid supply 14 and a plumbing fixture 16. Thus, the shut-off valve 12 selectively restricts and allows a flow of a fluid 18 to the plumbing fixture 16. The plumbing fixture 16 may be a toilet or the like. The fluid supply 14 may be a water line that supplies water to the plumbing fixture 16.

The shut-off valve 12 has an outlet 20. The outlet 20 has an outermost surface 22 and the outermost surface 22 is threaded. The shut-off valve 12 may be a water valve or the like. Moreover, the shut-off valve 12 may have failed internally. Thus, the shut-off valve 12 may no longer be capable of restricting the flow of the fluid 18.

A valve unit 24 is provided. The valve unit 24 is selectively fluidly coupled to the outlet on the shut-off valve 12 when the shut-off valve 12 fails. Thus, the valve unit 24 selectively restricts and allows the fluid 18 to flow to the plumbing fixture 16. The valve unit 24 facilitates a repair of the unregulated fluid flow without having to replace the shut-off valve 12.

The valve unit 24 comprises a fluid valve 26 that has an inlet 28 and an outlet 30. The inlet 28 has a distal end 32 with respect to the fluid valve 26. The outlet 30 has an outer surface 34 and the outer surface 34 is threaded. The distal end 32 of the inlet 28 engages the outlet 30 on the shut-off valve 12. Thus, the fluid valve 26 is in fluid 18 communication with the fluid supply 14. The outlet 30 on the fluid valve 26 threadably engages a fluid line 35 for the plumbing fixture 16.

A handle 36 is provided. The handle 36 is rotatably coupled to the fluid valve 26 and the handle 36 may be manipulated. The handle 36 selectively opens and closes the fluid valve 26. A ferrule 38 is provided and the ferrule 38 is positioned around the inlet 28. The ferrule 38 may be a plumbing ferrule or the like.

A compression fitting 40 is provided and the compression fitting 40 is positioned around the inlet 28. The compression fitting 40 threadably engages the outlet 20 on the shut-off valve 12. The ferrule 38 is compressed between the outlet on the shut-off valve 12 and the inlet 28 on the fluid valve 26. Thus, the ferrule 38 forms a fluid impermeable seal between the outlet 20 on the shut-off valve 12 and the distal end 32 of the inlet 28. The compression fitting 40 may be plumbing compression fitting 40 or the like.

In use, the valve unit 24 is fluidly coupled between the shut-off valve 12 and the plumbing fixture 16 when the shut-off valve 12 fails. The fluid line 35 for the plumbing fixture 16 is removed from the outlet on the shut-off valve 12. Each of the ferrule 38 and the compression fitting 40 are positioned around the inlet 28 on the valve unit 24.

The inlet 28 on the valve unit 24 is manipulated to engage the outlet 20 on the shut-off valve 12. The compression fitting 40 is manipulated to threadably engage the outlet on the shut-off valve 12. The fluid 18 line for the plumbing fixture 16 is manipulated to threadably engage the outlet on the valve unit 24. The handle 36 on the valve unit 24 is manipulated to selectively restrict and allow the fluid 18 to flow to the plumbing fixture 16.

Failed shut-off valves 12 are commonly corroded to the point that manipulating the shut-off valve 12 causes the shut-off valve 12 to be permanently fully open. Moreover, replacing a failed shut-off valve 12 requires a main water supply to be shut off. The main water supply may experience failure due to being manipulated. The valve unit 24 facilitates the unregulated fluid 18 flow to be repaired without manipulating the failed-shut off valve and the main water supply.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shut-off valve repair system comprising:
    a shut-off valve being configured to be fluidly coupled between a fluid supply and a plumbing fixture thereby facilitating said shut-off valve to selectively restrict and allow a flow of a fluid to the plumbing fixture, said shut-off valve having an outlet, said outlet having an outermost surface, said outermost surface being threaded;
    a valve unit being selectively fluidly coupled to said outlet on said shut-off valve when said shut-off valve fails wherein said valve unit is configured to selectively inhibit and allow the fluid to flow to the plumbing fixture, said valve unit including a fluid valve having an inlet and an outlet, said inlet having a distal end with respect to said fluid valve, said outlet having an outer surface, said outer surface being threaded, said distal end of said inlet engaging said outlet on said shut-off valve such that said fluid valve is in fluid communication with the fluid supply, said outlet on said fluid valve being configured to threadably engage a fluid line for the plumbing fixture; and
    a handle being rotatably coupled to said fluid valve wherein said handle is configured to be manipulated, said handle selectively opening and closing said fluid valve.

2. The system according to claim 1, further comprising a ferrule being positioned around said inlet.

3. The system according to claim 2, further comprising a compression fitting being positioned around said inlet, said compression fitting engaging said outlet on said shut-off valve, said ferrule being compressed between said outlet on said shut-off valve and said inlet on said fluid valve such that said ferrule forms a fluid impermeable seal between said outlet on said shut-off valve and said distal end of said inlet.

4. A shut-off valve repair system comprising:
    a shut-off valve being configured to be fluidly coupled between a fluid supply and a plumbing fixture thereby facilitating said shut-off valve to selectively restrict and allow a flow of a fluid to the plumbing fixture, said shut-off valve having an outlet, said outlet having an outermost surface, said outermost surface being threaded; and
    a valve unit being selectively fluidly coupled to said outlet on said shut-off valve when said shut-off valve fails wherein said valve unit is configured to selectively inhibit and allow the fluid to flow to the plumbing fixture, said valve unit comprising:
        a fluid valve having an inlet and an outlet, said inlet having a distal end with respect to said fluid valve, said outlet having an outer surface, said outer surface being threaded, said distal end of said inlet engaging said outlet on said shut-off valve such that said fluid valve is in fluid communication with the fluid supply, said outlet on said fluid valve being configured to threadably engage a fluid line for the plumbing fixture,
        a handle being rotatably coupled to said fluid valve wherein said handle is configured to be manipulated, said handle selectively opening and closing said fluid valve,
        a ferrule being positioned around said inlet, and
        a compression fitting being positioned around said inlet, said compression fitting threadably engaging said outlet on said shut-off valve, said ferrule being compressed between said outlet on said shut-off valve and said inlet on said fluid valve such that said ferrule forms a fluid impermeable seal between said outlet on said shut-off valve and said distal end of said inlet.

* * * * *